United States Patent Office 2,722,064
Patented Nov. 1, 1955

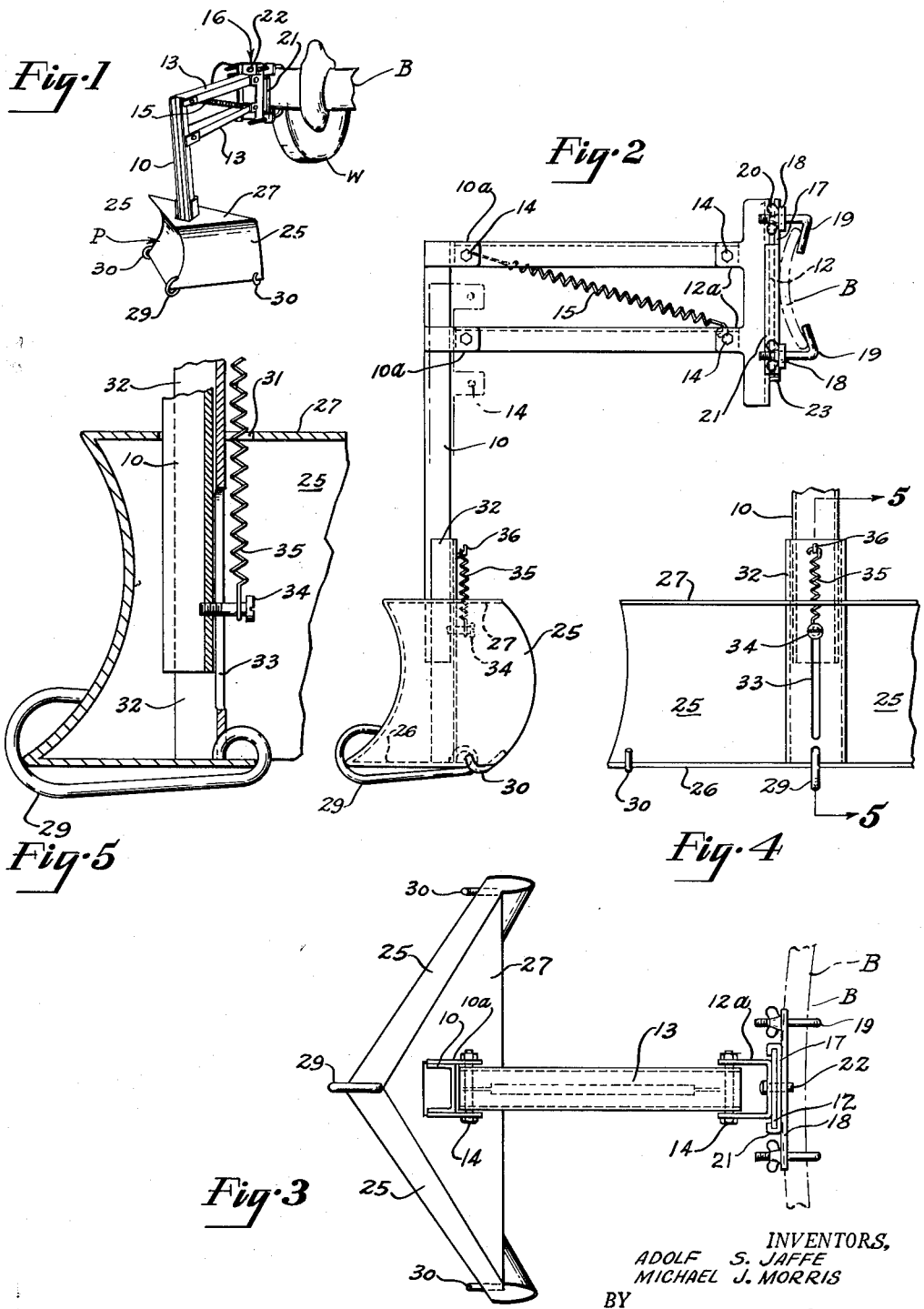

2,722,064

WHEEL TRACK CLEARING SNOW PLOW FOR AUTOMOTIVE VEHICLES

Adolf S. Jaffe, University Heights, and Michael J. Morris, Cleveland, Ohio

Application October 28, 1952, Serial No. 317,320

4 Claims. (Cl. 37—42)

The present invention relates to improvements in plows and particularly to improvements in plows for use on automotive vehicles.

Hitherto several forms of snow plows have been proposed and manufactured for use on automotive vehicles. Many of these devices labored under the disadvantages of imposing too great a load upon the vehicle itself, of not maintaining proper position relative to non-level road surfaces, and of being readily snagged by road surfaces whereover they pass and thereby suffering damage or causing damage to the vehicle. The present device, though also useful in clearing other materials on a roadway, such as drifted sand, is hereinafter termed a snow plow. It comprises a snow plow adapted for mounting at one side of a vehicle, such as a truck or passenger car, in alignment with the wheels thereof, in order to clear a track amply wide for the passage of the wheels on that side, the object being that by the use of a pair of such plows, one at each side of the vehicle, only so much snow is removed as is required to allow clear passageway. Thus there is no drain upon the power plant of the vehicle to remove an unnecessary load or mass of snow as has been the case in unitary plows of the type which cleared a path the width of the vehicle. Moreover, the plow blade is mounted to the vehicle by means allowing the blade to adjust its position relative to the vehicle so that as varying roadway surface contours or roadway projections are encountered efficient plowing may be maintained without likelihood of the plow blade snagging the roadway or objects therein to the detriment either of the blade or plow structure or the vehicle to which mounted.

Hence, an object of the invention is the provision of a snow plow device adapted to be readily demounted and mounted as needed at one side of an automotive vehicle in alignment with the corresponding lateral pair of wheels. Another object is the provision of a snow plow wherein means are provided for mounting the plow blade to the vehicle which allows relative movement between the plow blade and the vehicle in a fashion to accommodate variations in the roadway surface or its disposition. Another object is the provision of a snow plow device adapted for clearing a track for wheels at one side of a vehicle wherein the form of the plow blade and movable means for mounting the blade to the vehicle provide insurance against snagging of the blade on surface projections or jamming against a slanting surface while maintaining proper surface contact for efficient plowing. Other objects and advantages of the invention will appear from the following description and the drawings wherein—

Fig. 1 represents in fragmentary fashion a bumper and the nearby wheel at one side of an automotive vehicle to which the plow device of this invention is attached;

Fig. 2 is a side elevational view of the plow;

Fig. 3 is a top plan view of the device corresponding to Fig. 2;

Fig. 4 is a fragmentary representation of the plow blade viewed from the rear; and Fig. 5 is a fragmentary longitudinal section taken through the plow blade substantially along the line 5—5 in Fig. 4.

In Fig. 1 of the drawings, wherein is represented, in fragmentary fashion, one side of either the front or rear of an automotive vehicle, the snow plow of this invention is shown mounted with the blade portion P thereof in line with the corresponding lateral pair of wheels of which one wheel thereof appears, it being understood that a second snow plow is similarly disposed at the other side of the bumper relative to the other wheels.

As may be best seen in Figs. 2–5, the snow plow comprises the plow blade P, hereinafter described in detail, mounted in slideable fashion on the vertical member 10 for limited vertical movement relative thereto; a base plate 12; a vertically spaced, parallel pair of equal link members 13 secured at opposite ends within channels or pivot brackets 10a and 12a, respectively, on the upper portion of the vertical member 10 and on the base plate 12, by horizontal bolts or pivot pins 14; a tension spring 15 with one end secured to the uppermost pivot pin at vertical member 10 and the other end to the lowermost link member or pivot pin at the base plate 12; and, removably holding the plate 12, a bumper clamping bracket 16 secured on the bumper B. Spring 15 may be connected at other points within the structural parallelogram defined by the base plate, member 10 and links 13 to urge the member 10 downwardly.

The clamping bracket 16 preferably may be semipermanently affixed to the bumper and be adapted to secure the base plate 12 in a manner allowing easy and rapid mounting and demounting of the major portion of the snow plow structure. Hence the clamping bracket 16 is shown as including a plate 17 bearing near each side edge a pair of apertured ears 18 with the apertures vertically spaced at a distance somewhat greater than the width of bumper B, bumper clamping bolts 19 extending through the apertured ears to engage the bumper and tightened by nuts 20 bearing on the ears, and parallel channel formations 21 along opposite vertical edges of the plate 17 which form slots embracing opposite vertical edge portions of the base plate 12 when the latter is slid into place in the clamping bracket.

The ends of the bumper clamping bolts 19 are hooked for marginal engagement behind the usually concave rear face of the bumper B. Locking means, such as a bolt or a removable pin 22, secured by a cotter pin if desired, is passed through suitably aligned apertures in the plate 17 and the base plate 12 to hold the base plate in position in the clamping bracket. Preferably a stop formation or projection 23 for engaging the bottom of base plate 12 is provided on plate 17 to position the base plate 12 when slid into the bracket plate for easy insertion of the pin 22 during mounting of the plow to the bumper. By using nuts 20 which have a convex surface bearing on the ears 18 and having the apertures slightly oversize, the bolts 19 may readily be positioned to engage bumpers of various widths. To prevent the plate 17 from marring the bumper finish, there may be used therebetween an insert of plastic, tough rubber, textile or other suitable material.

In the snow plow blade P, two vertically curved, angularly disposed snow diverting faces 25 joined along a forward apex line are reenforced in their angular disposition by a triangular bottom plate 26 spanning the space between the bottom edges of the faces 25 and welded thereto, and a triangular top plate 27 similarly disposed relative to the top edges of the side faces. To serve as guides and provide clearance between the bottom edges of the faces 25 and the road surface, a central guide 29 and lateral guides 30 formed from rod stock are welded to the bottom of blade P. The form of these guides may be seen in Figs. 2 and 5. The central guide 29 at its forward end is curved around the center of the forward point of the plow blade in semi-circular fashion and extends rearwardly to an end portion curled about the back edge of plate 26. The maximum spacing or projection of the guide 29 from the bottom plate 26 may be on the order of one-half inch to keep the plow blade bottom and edges from coming into direct contact with the roadway surface. The rounded forward edge of the guides lifts the plow blade smoothly over any unevenness in the road surface which may be encountered. The lateral guides 30 near the outer ends of the faces 25 are curved upwardly in front of the face edge to provide a similar guidance and a lesser rear clearance.

The plow blade P has a guide channel 32 welded to the bottom and top plates 26, 27 and extending through the opening 31 in the top plate 27 to provide a slideway receiving the vertical member 10. Within the blade the channel 32 has a vertical slot 33 through which a pin or bolt 34 extends to serve as a stop means limiting sliding of the plow on the vertical member. A tension spring 35, with lower end secured to the bottom of member 10 by bolt 34 and upper end secured on a hook or lug 36 near the top of the slide channel 32, normally maintains member 10 and blade P in extended relation, despite the weight of members 10 and 13, and vertical force component of spring 15.

When such snow plows are to be used on an automobile, for example, two are mounted on the bumper at that end of the auto toward the direction of motion, each being secured to the bumper in alignment with the corresponding lateral pair of wheels. The bracket plate 16 is secured to the bumper by placing it against the outer face thereof, positioning the hooked ends of the bolts 19 behind the edges of the bumper and tightening the nuts 20 to draw the plate 17 tightly against the outer bumper face. It desired, there may be interposed between the plate 17 and the outer face of the bumper a spacing insert having a surface complementary to the bumper face. The clamping bracket may be left thus secured to the bumper throughout the season of contemplated use. To mount the rest of the assembly the base plate 12 is slid into the bracket plate between the channels 21 until stopped by the stop 23. Then the pin or bolt 22 is passed through the base plate 12 and the plate 17 to secure plow assembly in position in the bracket plate. When the main portion of the plow assembly is demounted the pin 22 is simply withdrawn and the base plate 12 slid upwardly out of the clamping bracket. For storage, the linkage system and base plate 12 may be folded down into position against member 10 and the plow blade, so that the size of the device is reduced and is easily handled and stored.

When in use, the weight of the plow blade and force of spring 15 holds the blade down in contact with the road surface for removal of snow as the vehicle advances. Thus, two tracks for the wheels are cleared of all but a thin layer of snow remaining due to the clearance caused by the guides. Due to the form of the forward end of the guide 29 and also the clearance provided, the forward lower point of the plow and the lower face edges are prevented from digging into the roadway surface or from coming into engagement with projections. The hinged linking system as well as the sliding mounting of the plow blade on member 10 permits the plow blade to ride upward and downward in accordance with the surfaces over which it passes and this motion is permitted independently of the disposition of the surfaces on which the wheels of the vehicle rest. Thus, when the vehicle passes over a roadway which is convex in direction of travel, the plow blade can drop downwardly under the force of spring 15 to maintain its proper plowing position relative to the road, while if the road surface is concave it may ride upwardly in accommodation therefor. Similarly, where a discontinuity in the road surface is encountered, as for example at the juncture of driveways with sidewalks or streets, the plow blade can pass over such while maintaining proper plowing position yet without danger of jamming, as may particularly occur with rigidly positioned blades where the discontinuity produces in effect a sharply concave disposition in the path of travel.

In the event that braking of the vehicle, which often causes a downward sway of the chassis, should occur at a time when the roadway contour has displaced the linkage system to its upper limit of position, the resilient slidable mounting of the blade on vertical member 10 then comes into function to permit downward movement of the blade support system relative to the blade and so prevent damage to plow and vehicle. The independent movement of the plow structures at opposite sides of the vehicle accommodate transverse level differences in the roadway surfaces.

We claim:

1. A snow plow adapted to clear a track on the roadway before a lateral pair of wheels of an automotive vehicle, comprising a plow blade including a pair of snow diverting faces joined along and diverging rearwardly from a leading apex; a plow blade supporting member extending vertically upward from said plow blade; said blade having an upwardly extending column telescoped with the supporting member a vertically disposed base member; a pair of vertically spaced, parallel, equal length link members each pivotally secured at one end to the upper portion of said supporting member and at the other end to said base member; a spring secured within the parallelogram defined by the said members for urging the said supporting member downwardly; and a spring element connected to the blade column and the supporting member thereby to maintain the column and said member in an extended relation in opposition to the influence of said first named spring.

2. A snow plow adapted to clear a track on the roadway before a lateral pair of wheels of an automotive vehicle, comprising a plow blade including a pair of snow diverting faces joined along and diverging rearwardly from a leading apex and including a vertical element disposed between and secured to said faces; a plow blade supporting member extending vertically upward from said plow blade, the lower end of said supporting member and said vertical element forming a slide and slideway structure for relative vertical movement only between plow blade and support member; a spring operatively disposed between, and urging into extended relation, said plow blade and said supporting member; a vertically disposed base member; a pair of vertically spaced, parallel, equal length link members each pivotally secured at one end to the upper portion of said supporting member and at the other end to said base member to provide parallel motion bars operable in one vertical plane only; a spring secured within the structural parallelogram defined by the said members to urge the said support member downwardly; and means for rigidly securing said base member to an automotive vehicle with said link members disposed in said vertical plane whereby the plow blade may be mounted in alignment with a lateral pair of wheels thereof.

3. A snow plow adapted to clear a track on the roadway before a lateral pair of wheels of an automotive vehicle, comprising a plow blade including a pair of snow diverting faces joined along and diverging rearwardly from a leading apex; a plow blade supporting member extending vertically upward from said plow blade; a vertically disposed base member; a pair of vertically spaced, parallel, equal length link members each pivotally secured at one end to the upper portion of said supporting member and at the other end to said base member to provide parallel motion bars serving as a pivoted connection confining the link motion to a vertical plane extending longitudinally of the vehicle; a spring secured within the parallelogram defined by the said members for urging the said supporting member downwardly; and means for detachably securing said base member to the bumper of an automotive vehicle whereby the plow blade may be mounted in alignment with a lateral pair of wheels thereof while disposing the links in said vertical plane, said means including a clamping plate having one face thereof adapted to slideably engage said base member, means for releasably locking said base member to said clamping plate, and adjustable clamping members carried by said clamping plate adapted to engage the said bumper and secure thereto the said clamping plate with the link mechanism and blade disposed as aforesaid.

4. A snow plow adapted to clear a track on the roadway before a lateral pair of wheels of an automotive vehicle, comprising a plow blade including a pair of upright snow diverting faces joined along and diverging rearwardly from a leading apex and including a vertical element having a rectangular cross section disposed between and secured to said faces; runners secured to said plow blade having an outer surface curving convexly around and under the lowermost forward point of the plow blade apex adapted to guide the plow blade over unevenness in the roadway and to provide clearance between the roadway and the lower edges of said plow faces; a plow blade supporting member having a hollow rectangular cross section thereby to receive the vertical element extending vertically upwardly from said plow blade, the lower end of said supporting member and said vertical element forming a slide and slideway structure for relative vertical movement between plow blade and support member; and a spring operatively disposed between, and urging into extended relation, said supporting member and said vertical element; a vertically disposed base member; a pair of vertically spaced, parallel, equal length link members each pivotally secured at one end to the upper portion of said supporting member and at the other end to said base member to provide parallel motion bars; and a tension spring secured within the structural parallelogram defined by the said members to urge the said supporting member downwardly.

References Cited in the file of this patent

UNITED STATES PATENTS

| | | |
|---|---|---|
| 1,199,075 | Hyde | Sept. 26, 1916 |
| 1,498,690 | Hunziker | June 24, 1924 |
| 1,506,634 | Hartshorn | Aug. 26, 1924 |
| 1,624,809 | Sewell | Apr. 12, 1927 |
| 1,675,145 | Styles | June 26, 1928 |
| 2,582,136 | Koblas | Jan. 8, 1952 |

FOREIGN PATENTS

| | | |
|---|---|---|
| 15,180 | Great Britain | of 1899 |